(12) United States Patent
Dunn et al.

(10) Patent No.: US 11,430,198 B1
(45) Date of Patent: Aug. 30, 2022

(54) METHOD AND DEVICE FOR ORIENTATION-BASED VIEW SWITCHING

(71) Applicant: Apple Inc., Cupertino, CA (US)

(72) Inventors: Cameron J. Dunn, Los Angeles, CA (US); Etienne H. Guerard, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/145,141

(22) Filed: Jan. 8, 2021

Related U.S. Application Data

(60) Provisional application No. 62/959,312, filed on Jan. 10, 2020.

(51) Int. Cl.
*G06T 19/20* (2011.01)
*G06T 19/00* (2011.01)
*G06T 7/73* (2017.01)

(52) U.S. Cl.
CPC .............. *G06T 19/20* (2013.01); *G06T 7/73* (2017.01); *G06T 19/006* (2013.01); *G06T 2219/028* (2013.01); *G06T 2219/2016* (2013.01)

(58) Field of Classification Search
CPC ......... G06T 19/20; G06T 7/73; G06T 19/006; G06T 2219/028; G06T 2219/2016
See application file for complete search history.

(56) References Cited

U.S. PATENT DOCUMENTS

| | | | |
|---|---|---|---|
| 2012/0169717 A1* | 7/2012 | Nakano | A63F 13/5252 345/419 |
| 2013/0249903 A1* | 9/2013 | Isokawa | A61B 6/5294 345/419 |
| 2013/0321401 A1* | 12/2013 | Piemonte | G09B 29/005 345/419 |
| 2017/0278486 A1* | 9/2017 | Ishikawa | G06F 3/048 |
| 2018/0247454 A1* | 8/2018 | Sawaki | G09G 5/00 |
| 2019/0259199 A1* | 8/2019 | Yee | G06T 19/20 |
| 2020/0330866 A1* | 10/2020 | Yang | A63F 13/2145 |

* cited by examiner

*Primary Examiner* — Chong Wu
(74) *Attorney, Agent, or Firm* — Fernando & Partners, LLP

(57) ABSTRACT

In some implementations, a method includes: obtaining a request to display a virtual object at a location within a computer-generated environment; and, in response to detecting the request to display the virtual object the location within the computer-generated environment: determining a real-world pose for the electronic device relative to a first coordinate space associated with a physical environment; determining a viewing vector by transforming the real-world pose from the first coordinate space to a second coordinate space associated with the computer-generated environment; in accordance with a determination that the viewing vector satisfies viewing criteria, displaying the virtual object at the location within the computer-generated environment according to a first view mode; and in accordance with a determination that the viewing vector satisfies second viewing criteria, displaying the virtual object at the location within the computer-generated environment according to a second view mode.

23 Claims, 9 Drawing Sheets

METHOD AND DEVICE FOR ORIENTATION-BASED VIEW SWITCHING

CROSS-REFERENCE TO RELATED APPLICATIONS

This application claims the benefit of U.S. Provisional Patent App. No. 62/959,312, filed on Jan. 10, 2020, which is incorporated by reference in its entirety.

TECHNICAL FIELD

The present disclosure generally relates to computer-generated environments, and in particular, to systems, methods, and devices for orientation-based view switching.

BACKGROUND

In some instances, while a computer-generated object is displayed to a user, the user may wish to change views of the computer-generated object, for example, from a perspective view to an orthographic view, from a three-dimensional (3D) view to a two-dimensional (2D) view, or from an exterior view to an interior view. Today a user may potentially be able to switch views of the computer-generated object via a user input such as selection of an affordance or a voice command. However, according to some implementations, the user experience described herein enables the user to switch between views of a computer-generated object based on a viewing orientation thereto.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
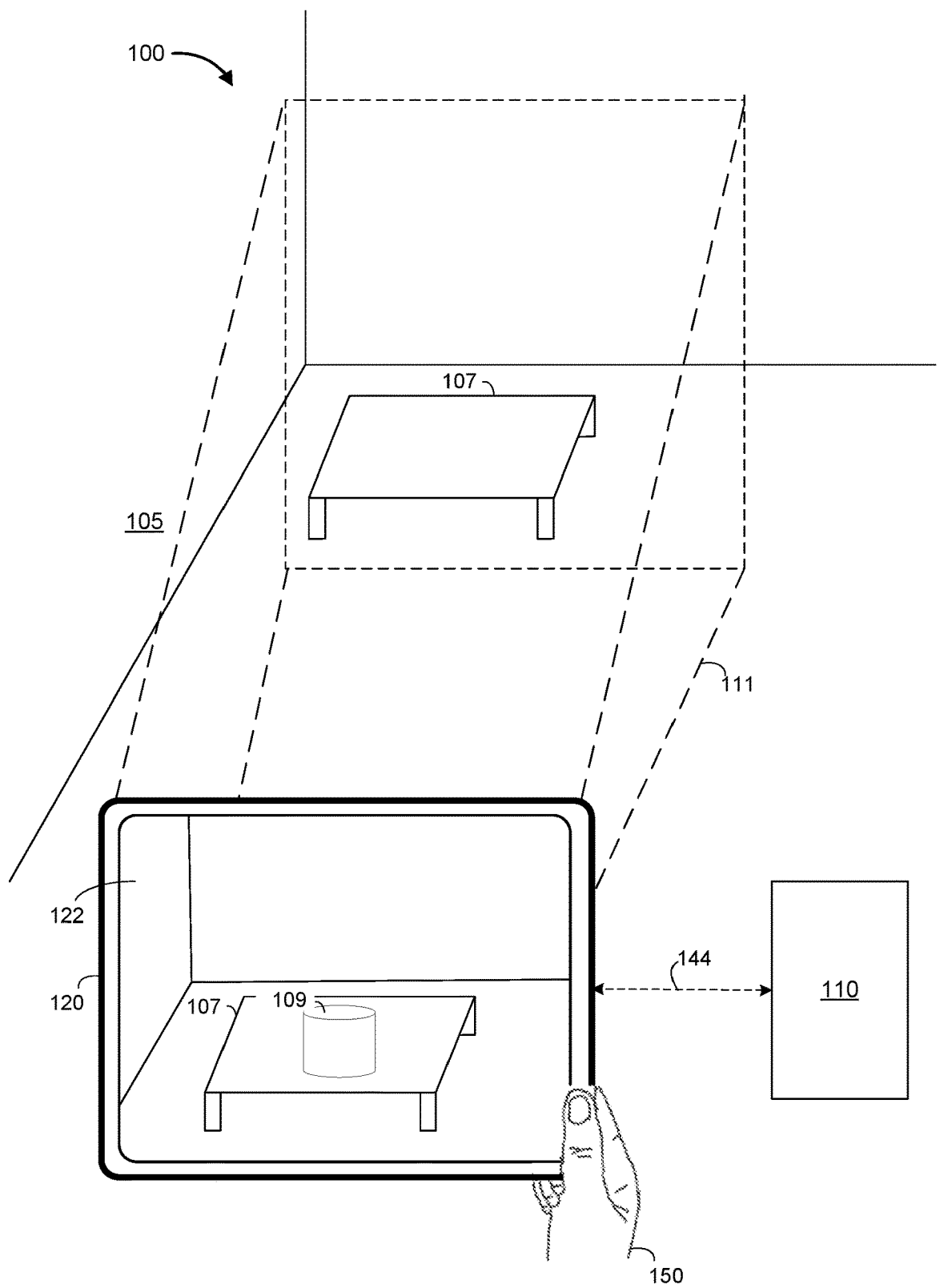
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for orientation-based view switching. According to some implementations, the method is performed at a device including one or more processors, non-transitory memory, a display device, and one or more input devices. The method includes: obtaining a request to display a virtual object at a first location within a computer-generated environment; and, in response to detecting the request to display the virtual object the first location within the computer-generated environment: determining a first real-world pose for the electronic device relative to a first coordinate space associated with a physical environment; determining a first viewing vector corresponding to a first field-of-view (FOV) of the computer-generated environment by transforming the first real-world pose from the first coordinate space to a second coordinate space associated with the computer-generated environment; in accordance with a determination that the first viewing vector satisfies first viewing criteria associated with the computer-generated environment, displaying the virtual object at the first location within the computer-generated environment according to a first view mode; and in accordance with a determination that the first viewing vector satisfies second viewing criteria associated with the computer-generated environment, displaying the virtual object at the first location within the computer-generated environment according to a second view mode.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (μLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina.

Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, wearable computing device, or the like).

In some implementations, the controller 110 is configured to manage and coordinate a CGR experience for a user 150 (sometimes also referred to herein as a "CGR environment" or a "computer-generated environment" or a "graphical environment"). In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video content to the user 150. In some implementations, the electronic device 120 is configured to present the CGR experience to the user 150. In some implementations, the electronic device 120 includes a suitable combination of software, firmware, and/or hardware. The electronic device 120 is described in greater detail below with respect to FIG. 3.

According to some implementations, the electronic device 120 presents a computer-generated reality (CGR) experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the CGR experience, the electronic device 120 is configured to present CGR content (e.g., a CGR cylinder 109) (sometimes also referred to herein as a "virtual object" or a "computer-generated object" or a "graphical object") and to enable video pass-through of the physical environment 105 (e.g., including the table 107) on a display 122. For example, the CGR experience, including the CGR cylinder 109, is volumetric or three-dimensional (3D).

In one example, the CGR cylinder 109 corresponds to display-locked content such that the CGR cylinder 109 remains displayed at the same location on the display 122 as the FOV 111 changes due to translational and/or rotational movement of the electronic device 120. As another example, the CGR cylinder 109 corresponds to world-locked content such that the CGR cylinder 109 remains displayed at its origin location as the FOV 111 changes due to translational and/or rotational movement of the electronic device 120. As such, in this example, if the FOV 111 does not include the origin location, the CGR experience will not include the CGR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the CGR content (e.g., the CGR cylinder 109) onto the additive display, which is, in turn, overlaid on the physical environment 105 from the perspective of the user 150. In some implementations, the electronic device 120 presents the user interface by displaying the CGR content (e.g., the CGR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the CGR content (e.g., a single display or one for each eye). For example, the electronic device 120 encloses the field-of-view of the user 150. In such implementations, the electronic device 120 presents the CGR environment by displaying data corresponding to the CGR environment on the one or more displays or by projecting data corresponding to the CGR environment onto the retinas of the user 150.

In some implementations, the electronic device 120 includes an integrated display (e.g., a built-in display) that displays the CGR environment. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the CGR environment. In some implementations, the electronic device 120 is replaced with a CGR chamber, enclosure, or room configured to present CGR content in which the user 150 does not wear the electronic device 120.

In some implementations, the controller 110 and/or the electronic device 120 cause a CGR representation of the user 150 to move within the CGR environment based on movement information (e.g., body pose data, eye tracking data, hand tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
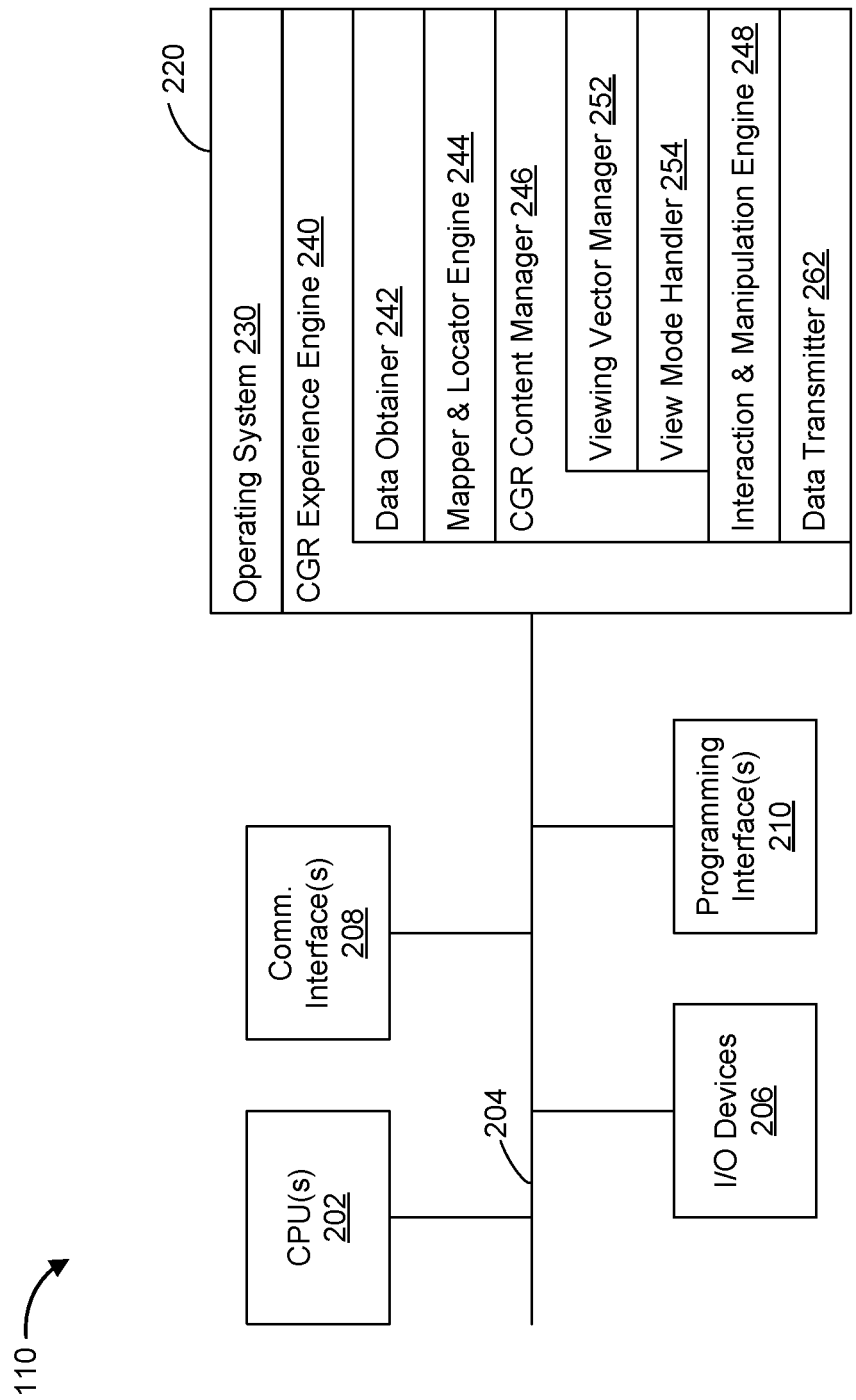
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a computer-generated reality (CGR) experience engine 240.

The operating system 230 includes procedures for handling various basic system services and for performing hardware dependent tasks.

In some implementations, the CGR experience engine 240 is configured to manage and coordinate one or more CGR experiences (sometimes also referred to herein as "CGR environments") for one or more users (e.g., a single CGR experience for one or more users, or multiple CGR experiences for respective groups of one or more users). To that end, in various implementations, the CGR experience engine 240 includes a data obtainer 242, a mapper and locator engine 244, a CGR content manager 246, an interaction and manipulation engine 248, and a data transmitter 262.

In some implementations, the data obtainer 242 is configured to obtain data (e.g., presentation data, input data, user interaction data, head tracking information, camera pose tracking information, eye tracking information, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 with respect to the physical environment 105. To that end, in various implementations, the mapper and locator engine 244 includes instructions and/or logic therefor, and heuristics and metadata therefor.

In some implementations, the CGR content manager 246 is configured to generate (i.e., render), manage, and modify a CGR environment presented to a user. To that end, in various implementations, the CGR content manager 246 includes instructions and/or logic therefor, and heuristics and metadata therefor. In some implementations, the CGR content manager 246 includes a viewing vector manager 252 and a view mode handler 254.

In some implementations, the viewing vector manager 252 is configured to determine a real-world pose for the electronic device relative to a first coordinate space associated with a physical environment. In some implementations, the viewing vector manager 252 is also configured to determine a viewing vector corresponding to a field-of-view (FOV) of the CGR environment by transforming the real-world pose from the first coordinate space to a second coordinate space associated with the CGR environment. To that end, in various implementations, the viewing vector manager 252 includes instructions and/or logic therefor, and heuristics and metadata therefor.

In some implementations, the view mode handler 254 is configured to display the CGR object at the first location within the CGR environment according to a first view mode when the viewing vector satisfies first viewing criteria associated with the CGR environment. In some implementations, the first viewing criteria is satisfied when the viewing vector associated with the exterior-facing image sensor of the electronic device 120 is substantially parallel to a ground plane within the CGR environment or a plane associated with the first location, and the first location is within the FOV associated with the first viewing vector.

In some implementations, the view mode handler 254 is configured to display the CGR object at the first location within the CGR environment according to a second view mode when the viewing vector satisfies the second viewing criteria associated with the CGR environment. In some implementations, the second viewing criteria is satisfied when the viewing vector associated with the exterior-facing image sensor of the electronic device 120 is substantially perpendicular to the ground plane within the CGR environment or a plane associated with the first location, and the first location is within the FOV associated with the first viewing vector.

In some implementations, the view mode handler 254 is configured to display the CGR object within the CGR environment according to the second view mode when the viewing vector satisfies the third viewing criteria. In some implementations, the third viewing criteria is satisfied when the first location is not within the FOV associated with the first viewing vector. To that end, in various implementations, the view mode handler 254 includes instructions and/or logic therefor, and heuristics and metadata therefor.

In some implementations, the interaction and manipulation engine 248 is configured to interpret user interactions and/or modification inputs directed to the CGR environment. To that end, in various implementations, the interaction and manipulation engine 248 includes instructions and/or logic therefor, and heuristics and metadata therefor.

In some implementations, the data transmitter 262 is configured to transmit data (e.g., presentation data such as rendered image frames associated with the CGR environment, location data, etc.) to at least the electronic device 120. To that end, in various implementations, the data transmitter 262 includes instructions and/or logic therefor, and heuristics and metadata therefor.

Although the data obtainer 242, the mapper and locator engine 244, the CGR content manager 246, the interaction and manipulation engine 248, and the data transmitter 262 are shown as residing on a single device (e.g., the controller 110), it should be understood that in other implementations, any combination of the data obtainer 242, the mapper and locator engine 244, the CGR content manager 246, the interaction and manipulation engine 248, and the data transmitter 262 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
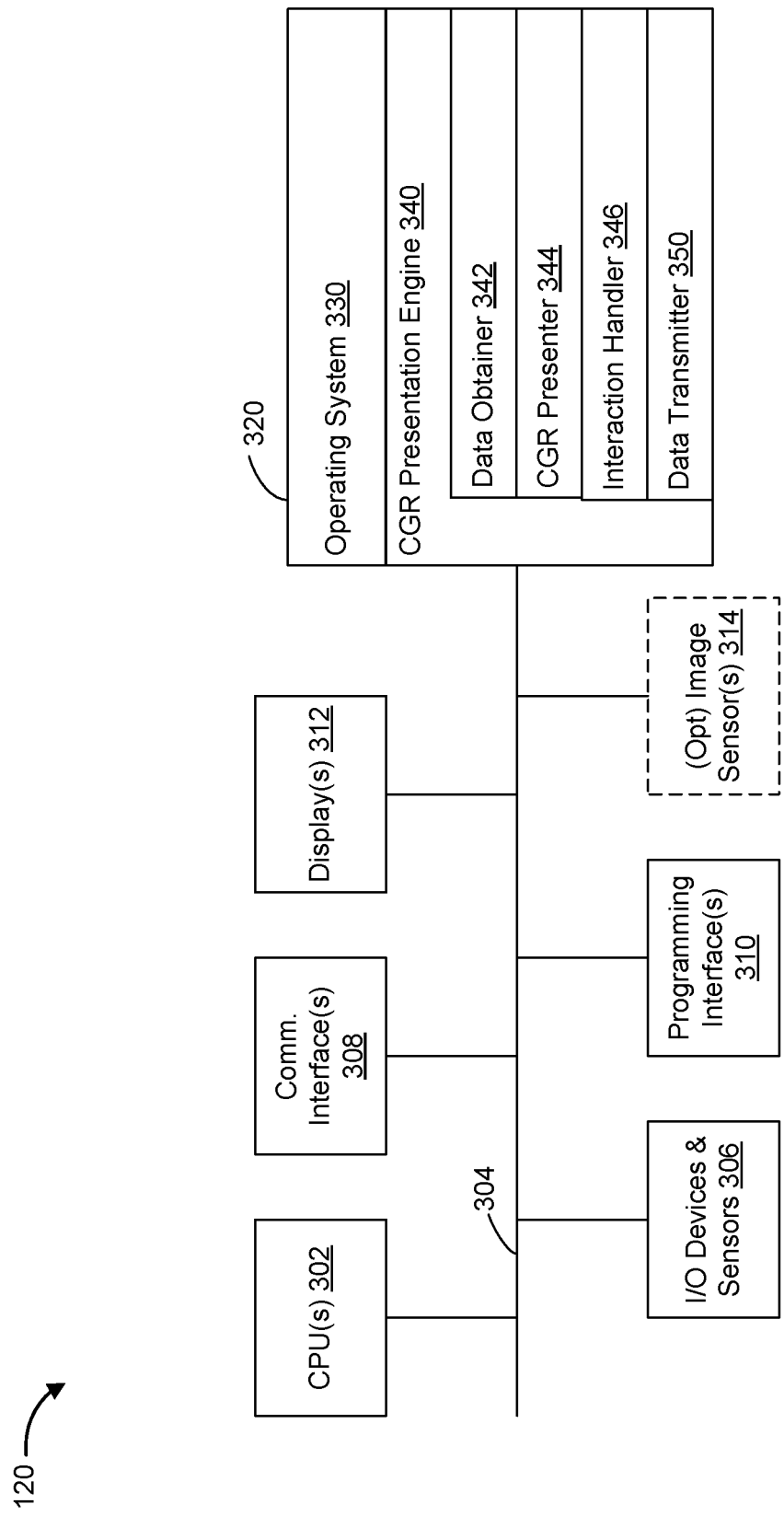
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior-and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), an eye tracking engine, a head pose tracking engine, a body pose tracking engine, a camera pose tracking engine, and/or the like.

In some implementations, the one or more displays 312 are configured to present the CGR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation engine 340.

The operating system 330 includes procedures for handling various basic system services and for performing hardware dependent tasks. In some implementations, the CGR presentation engine 340 is configured to present CGR content to the user via the one or more displays 312. To that end, in various implementations, the CGR presentation engine 340 includes a data obtainer 342, a CGR presenter 344, an interaction handler 346, and a data transmitter 350.

In some implementations, the data obtainer 342 is configured to obtain data (e.g., presentation data such as rendered image frames associated with the CGR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the CGR presenter 344 is configured to present and update CGR content (e.g., the rendered image frames associated with the CGR environment) via the one or more displays 312. To that end, in various implementations, the CGR presenter 344 includes instructions and/or logic therefor, and heuristics and metadata therefor.

In some implementations, the interaction handler 346 is configured to detect user interactions with the presented CGR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the CGR presenter 344, the interaction handler 346, and the data transmitter 350 are shown as residing on a single device (e.g., the electronic device 120), it should be understood that in other implementations, any combination of the data obtainer 342, the CGR presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4D illustrate a sequence of instances 410, 420, 430, and 440 of a computer-generated reality (CGR) presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 4A:
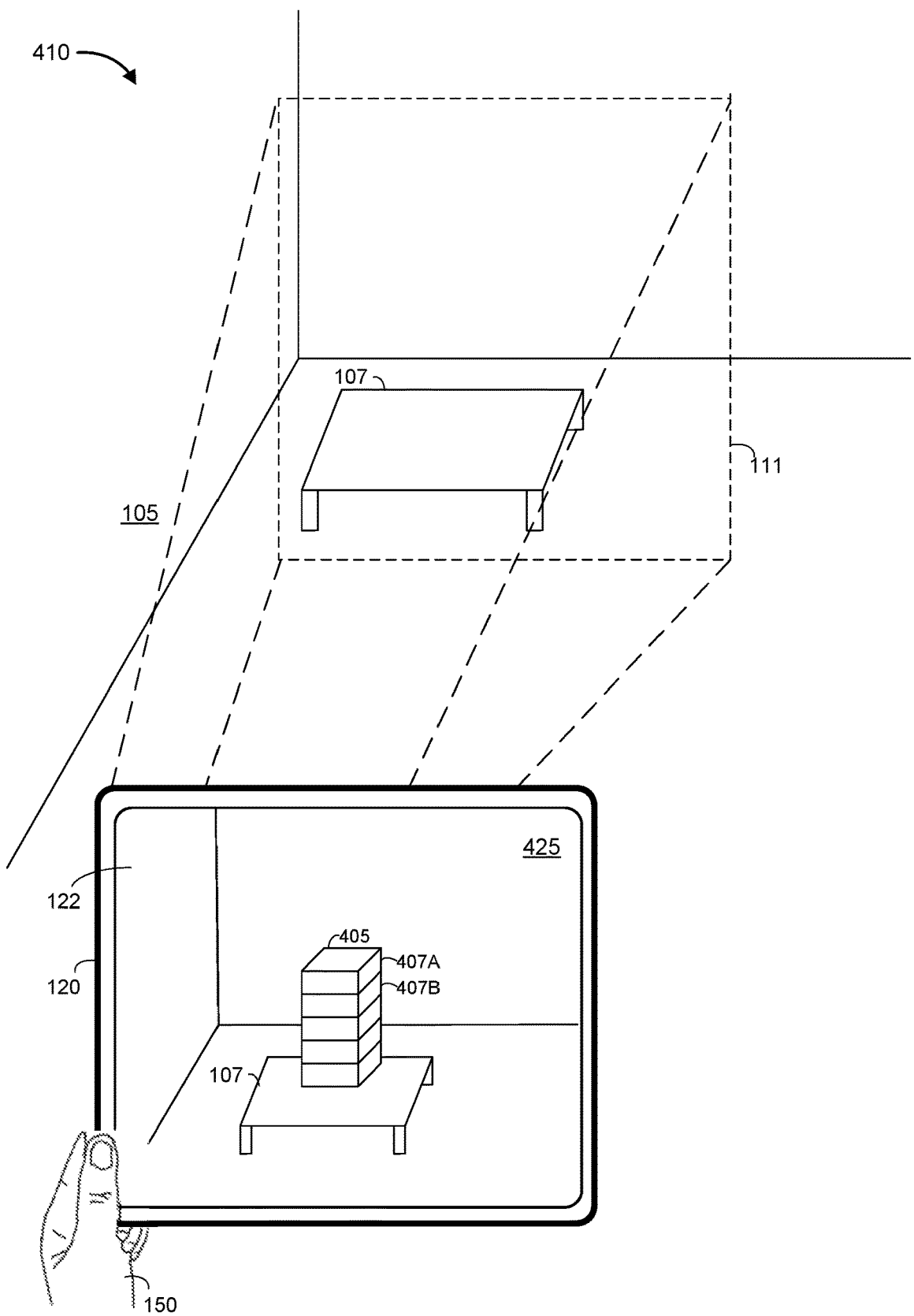
FIGS. 4A-4D illustrate a sequence of instances of a computer-generated reality (CGR) presentation scenario in accordance with some implementations.
Figure 4B:
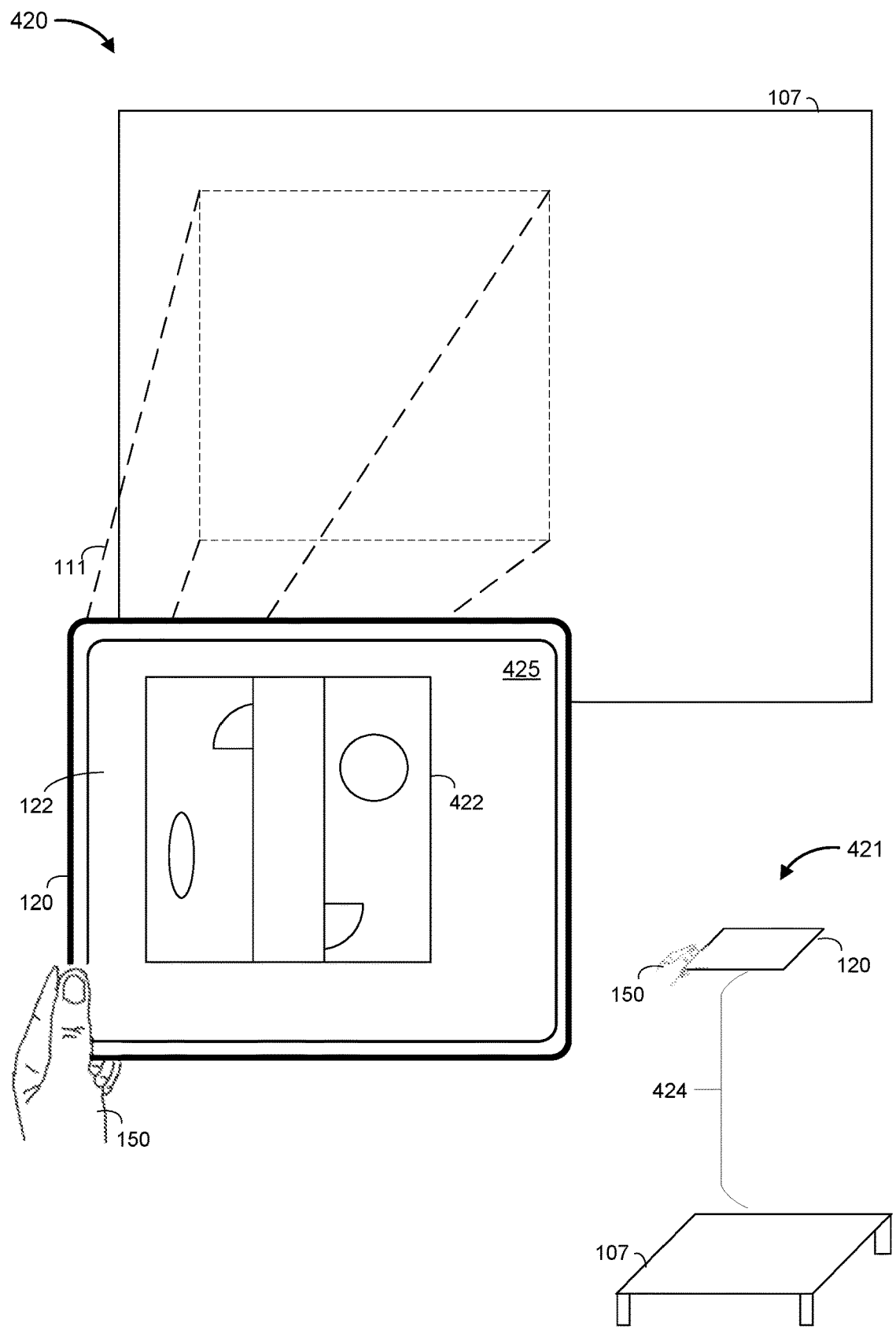
Figure 4C:
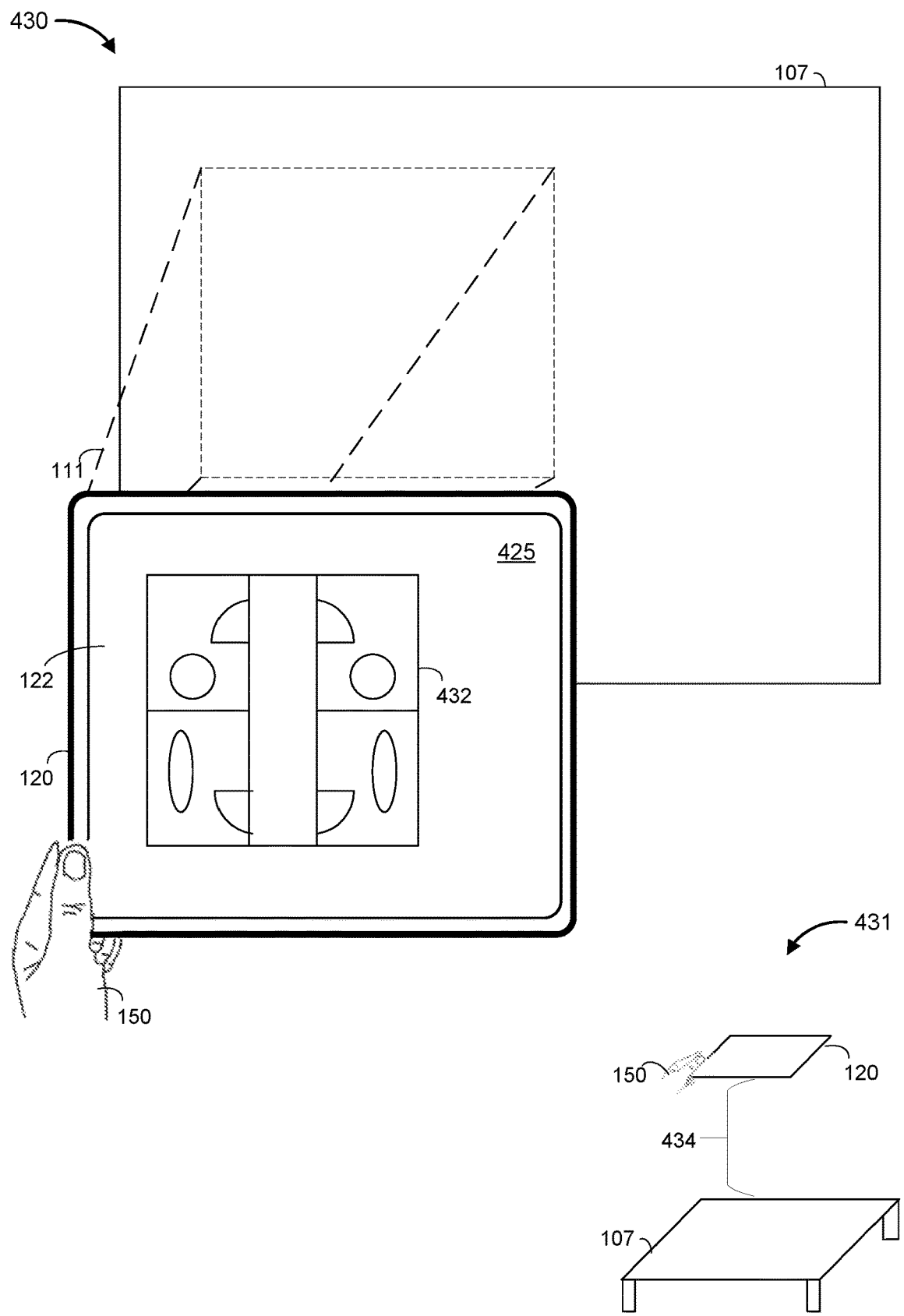

As shown in FIGS. 4A-4C, the CGR presentation scenario includes a physical environment 105 and a CGR environment 425 displayed on the display 122 of the electronic device 120. The electronic device 120 presents the CGR environment 425 to the user 150 while the user 150 is physically present within the physical environment 105 that includes the table 107 within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present CGR content and to enable optical see-through or video pass-through of at least a portion of the physical environment 105 (e.g., including the table 107) on the display 122. For example, the electronic device 120 corresponds to a mobile phone, tablet, laptop, wearable computing device, or the like.

As shown in FIG. 4A, during the instance 410 (e.g., associated with time $T_1$) of the presentation scenario, the viewing vector associated with the electronic device 120 satisfies the first viewing criteria. In some implementations, the first viewing criteria is satisfied when the viewing vector associated with the exterior-facing image sensor of the electronic device 120 is substantially parallel to a ground plane within the CGR environment or a plane associated with the first location, and the first location is within the FOV associated with the first viewing vector. The process for determining the viewing vector is described in more detail below with reference to FIG. 5 and the method 600 in FIG. 6.

In response to determining that the viewing vector satisfies the first viewing criteria at the instance 410, the electronic device 120 displays CGR content 405 at a first location (e.g., on top of a horizontal plane associated with the table 107) within the CGR environment 425 according to a first view mode in FIG. 4A. For example, the first view mode corresponds to a first-person view, perspective view, 3D view, etc. of the CGR content. For example, the CGR content 405 corresponds to a perspective view of a building with a plurality of floors including floors 407A and 407B. In some implementations, the first location is selected by the user 150. In some implementations, the first location is selected by the electronic device 120 and/or the controller 110 because the first location is associated with a plane. In some implementations, the first location is selected by the electronic device 120 and/or the controller 110 because the first location is associated with a plane within the FOV 111 that is at least X cm wide by Y cm high. In some implementations, the CGR content is selected by the user.

As shown in FIG. 4B, during the instance 420 (e.g., associated with time $T_2$) of the presentation scenario, the viewing vector associated with the electronic device 120 satisfies the second viewing criteria. In some implementations, the second viewing criteria is satisfied when the viewing vector associated with the exterior-facing image sensor of the electronic device 120 is substantially perpendicular to the ground plane within the CGR environment or a plane associated with the first location, and the first location is within the FOV associated with the first viewing vector.

In response to determining that the viewing vector satisfies the second viewing criteria at the instance 420, the electronic device 120 displays CGR content 422 at a first location (e.g., a horizontal plane associated with the table 107) within the CGR environment 425 according to a second view mode in FIG. 4B. For example, the second view mode corresponds to a third person view, orthographic view, 2D view, etc. of the CGR content. For example, the CGR content 422 corresponds to a plan view of the floor 407A of the building with the plurality of floors.

Furthermore, an illustrative third person view 421 is shown in FIG. 4B. As shown by the third person view 421, the electronic device 120 is substantially perpendicular to a horizontal plane associated with the table 107. In FIG. 4B, a distance 424 separates the electronic device 120 and the table 107.

As shown in FIG. 4C, during the instance 430 (e.g., associated with time $T_3$) of the presentation scenario, the viewing vector associated with the electronic device 120 still satisfies the second viewing criteria. In some implementations, the second viewing criteria is satisfied when the viewing vector is substantially perpendicular to the ground plane within the CGR environment or a plane associated with the first location, and the first location is within the FOV associated with the first viewing vector.

In response to determining that the viewing vector satisfies the second viewing criteria at the instance 430, the electronic device 120 displays CGR content 432 at a first location (e.g., on top of a horizontal plane associated with the table 107) within the CGR environment 425 according to a second view mode in FIG. 4C. For example, the second view mode corresponds to a third person view, orthographic view, 2D view, etc. of the CGR content. For example, the CGR content 432 corresponds to a plan view of the floor 407B of the building with the plurality of floors.

Furthermore, an illustrative third person view 431 is shown in FIG. 4C. As shown by the third person view 431, the electronic device 120 is substantially perpendicular to a horizontal plane associated with the table 107. In FIG. 4C, a distance 434 separates the electronic device 120 and the table 107. For example, the distance 434 in FIG. 4C is less than the distance 424 in FIG. 4B. According to some implementations, while the viewing vector satisfies the second viewing criteria and the distance between the electronic device and a reference plane (e.g., the table 107) changes, the CGR content also changes based on the distance between the electronic device and the reference plane. Thus, the change in CGR content between FIGS. 4B and 4C corresponds to descending floors of the building because the distance is decreasing. If the distance increases, for example, the change in CGR content would correspond to ascending floors of the building.

Figure 4D:
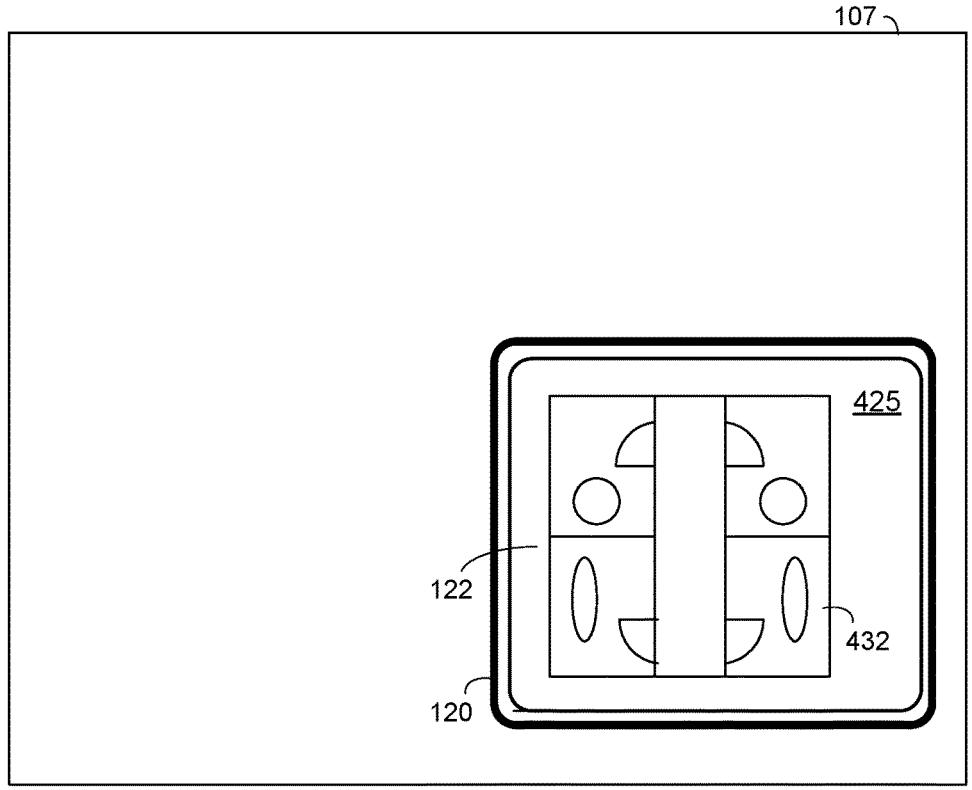
Figure 4D:
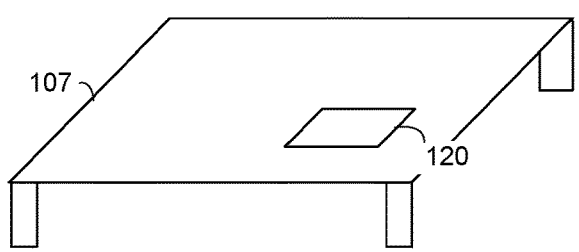

As shown in FIG. 4D, during the instance 440 (e.g., associated with time $T_4$) of the presentation scenario, the viewing vector associated with the electronic device 120 satisfies the third viewing criteria. In some implementations, the third viewing criteria is satisfied when the first location is not within the FOV associated with the first viewing vector. Furthermore, an illustrative third person view 441 is shown in FIG. 4D. As shown by the third person view 441, the electronic device 120 is situated on top of the table 107.

In response to determining that the viewing vector satisfies the third viewing criteria at the instance 440, the electronic device 120 displays CGR content 432 within the CGR environment 425 (e.g., the last displayed CGR content) according to a second view mode in FIG. 4D. For example, the second view mode corresponds to a third person view, orthographic view, 2D view, etc. of the CGR content. For example, the CGR content 432 corresponds to a plan view of the floor 407B of the building with the plurality of floors.

Figure 5:
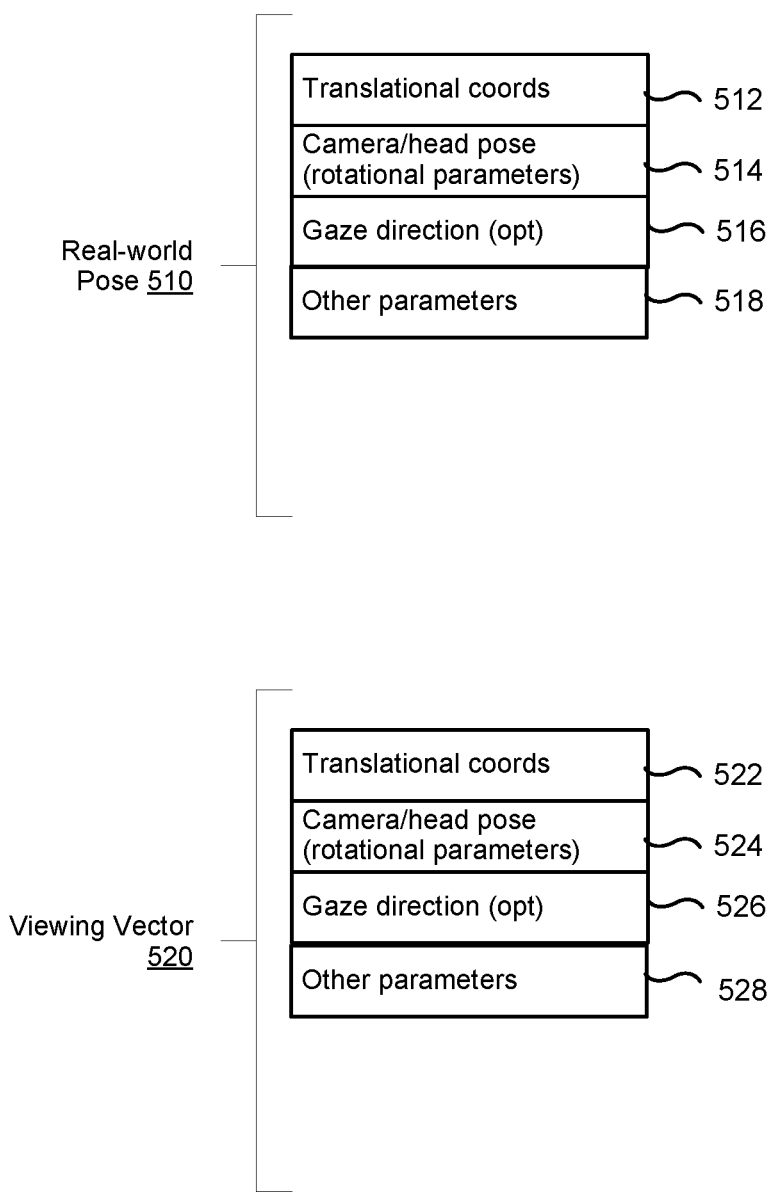
FIG. 5 illustrates block diagrams of example data structures in accordance with some implementations.

FIG. 5 illustrates block diagrams of example data structures in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. FIG. 5 shows block diagrams of a data structures for a real-world pose 510 and a viewing vector 520.

For example, the controller 110 or a component thereof (e.g., the viewing vector manager 252) obtains (e.g., receives, retrieves, or generates) the real-world pose 510 based on body pose tracking information, head tracking information, camera pose tracking information, eye tracking information, intrinsic camera parameters, and/or the like. According to some implementations, the real-world pose 510 includes translational coordinates 512 relative to the physical environment, camera/head pose information 514 (e.g., rotational parameters) associated with the user or camera, an optional gaze direction 516 (e.g., 2 degrees of freedom associated with eye tracking when a near-eye system is used) associated with the user, and other parameters 518 (e.g., focal length, zoom, and/or the like). As such, for example, the real-world pose 510 may comprise at least 8 degrees of freedom: x, y, z dimensions associated with the translational coordinates 512; roll, pitch, and yaw dimensions associated with the camera/head pose information 514; and first and second dimensions associated with the gaze direction 516.

For example, the controller 110 or a component thereof (e.g., the viewing vector manager 252) obtains (e.g., receives, retrieves, or generates) the viewing vector 520 by transforming the real-world pose 510 from a first coordinate space associated with a physical environment to a second coordinate space associated with the CGR environment. According to some implementations, the viewing vector 520 includes translational coordinates 522 relative to the CGR environment, camera/head pose information 524 (e.g., rotational parameters) associated with the user or camera, an optional gaze direction 526 (e.g., 2 degrees of freedom associated with eye tracking when a near-eye system is used) associated with the user, and other parameters 528 (e.g., focal length, zoom, and/or the like). As such, for example, the viewing vector 520 may comprise at least 8 degrees of freedom: x, y, z dimensions associated with the translational coordinates 522; roll, pitch, and yaw dimensions associated with the camera/head pose information 524; and first and second dimensions associated with the gaze direction 526.

Figure 6:
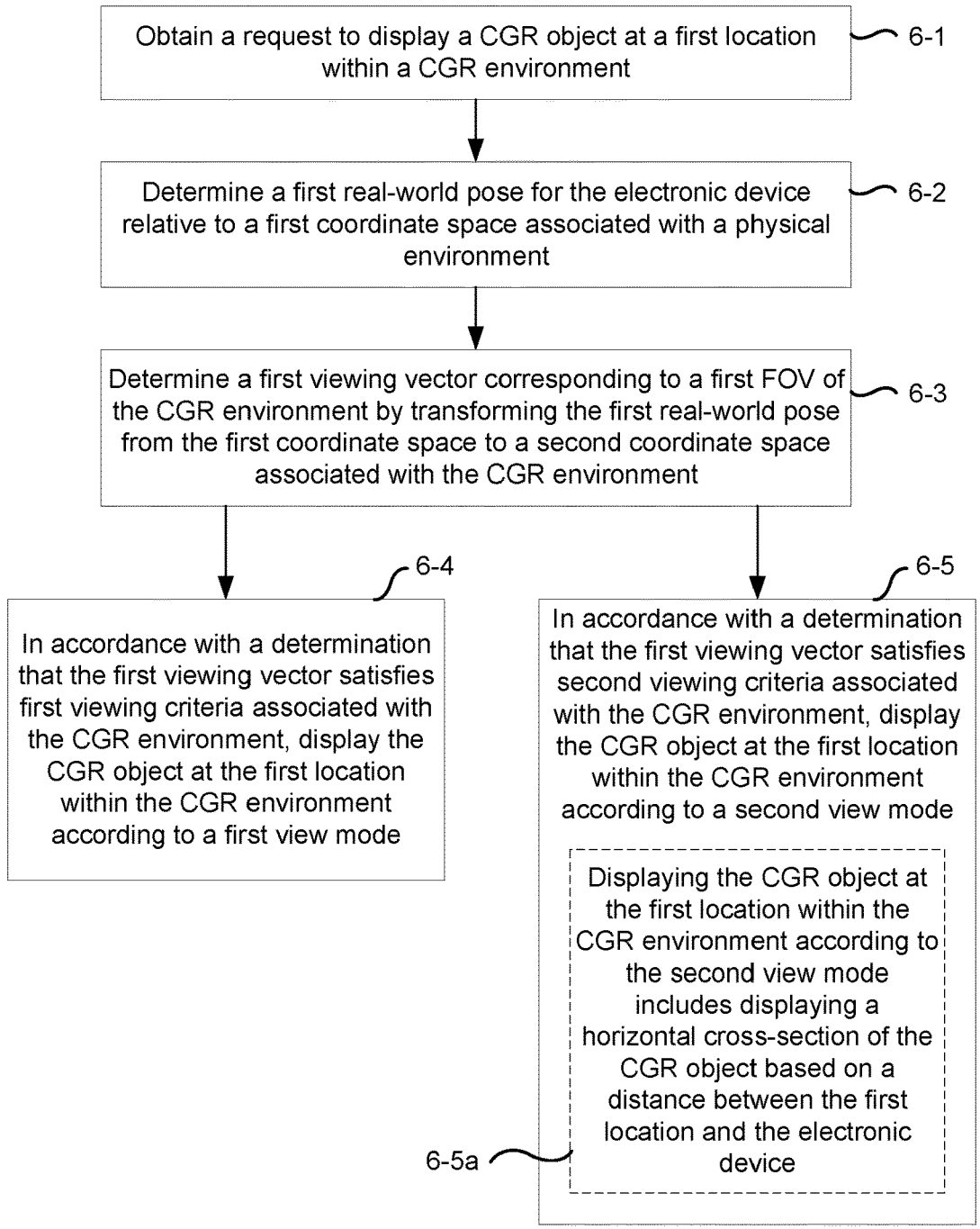
FIG. 6 is a flowchart representation of a method of orientation-based view switching in accordance with some implementations.

FIG. 6 is a flowchart representation of a method 600 of orientation-based view switching in accordance with some implementations. In various implementations, the method 600 is performed by a device with non-transitory memory and one or more processors coupled with the non-transitory memory (e.g., the controller 110 in FIGS. 1 and 2; the electronic device 120 in FIGS. 1 and 3; or a suitable combination thereof), or a component thereof. In some implementations, the method 600 is performed by processing logic, including hardware, firmware, software, or a combination thereof. In some implementations, the method 600 is performed by a processor executing code stored in a non-transitory computer-readable medium (e.g., a memory). In various implementations, some operations in method 600 are, optionally, combined and/or the order of some operations is, optionally, changed.

As described above, in some instances, while a CGR object is displayed to a user, the user may wish to change views of the CGR model, for example, from a perspective view to an orthographic view, from a 3D view to a 2D view, or from an exterior view to an interior view. Today a user may potentially be able to switch views of the CGR object via a user input such as selection of an affordance or a voice command. However, according to some implementations, the user experience described herein enables the user to switch between views of a CGR object based on a viewing orientation thereto. For asset creation or general viewing of CGR objects, the method described herein enables switching between different view modes (e.g., perspective vs. orthographic, 3D vs. 2D, etc.) of a CGR object based on the current viewing vector relative to a location at which the CGR object is displayed.

As represented by block 6-1, the method 600 includes obtaining a request to display a computer-generated reality (CGR) object (sometimes also referred to herein as a "virtual object" or a "computer-generated object" or a "graphical object") at a first location within a CGR environment (sometimes also referred to herein as a "computer-generated environment" or a "graphical environment"). In some implementations, the device or a component thereof (e.g., the interaction and manipulation engine 248 in FIG. 2) obtains (e.g., detects, receives, or retrieves) a request from a user to instantiate a CGR object at a first location within a CGR environment. For example, the CGR object corresponds to a 3D model. For example, the CGR environment is associated with a user's physical environment. In some implementations, the first location is selected by the user. In some implementations, the first location is selected by the device because the first location is associated with a plane. In some implementations, the first location is selected by the device because the first location is associated with a plane within the FOV of the user that is at least X cm wide by Y cm high. In some implementations, the CGR content is selected by the user.

As shown in FIG. 4A, for example, the electronic device 120 or a component thereof (e.g., the data obtainer 342 or the interaction handler 346 in FIG. 3) detects a request from the user 150 (e.g., via a voice command, touch input, or the like) to instantiate a CGR object associated with a model of a building on the table 107. Continuing with this example, the electronic device 120 or a component thereof (e.g., the data transmitter 350 in FIG. 3) sends an indication of the request from the user 150, including the selected CGR content and location, to the controller 110. In some implementations, the electronic device 120 or a component thereof (e.g., the data transmitter 350 in FIG. 3) also sends eye tracking information, head pose information, body pose tracking information, camera pose tracking information, and/or the like to the controller 110.

In response to detecting the request to display the CGR object the first location within the CGR environment, as represented by block 6-2, the method 600 includes determining a first real-world pose for the electronic device relative to a first coordinate space associated with a physical environment. For example, the first real-world pose characterizes a field-of-view (FOV) of the image sensors of the electronic device (and, as a result, the FOV for the user of the electronic device) from a first set of translational coordinates (relative to the first coordinate space for the physical environment), wherein the first real-world pose includes a camera/head pose (e.g., rotational coordinates), gaze direction, focal length, zoom, device orientation (landscape or portrait), etc. As one example, the real-world pose 510 in FIG. 5 illustrates an example data structure therefor.

In some implementations, the controller 110 or a component thereof (e.g., the viewing vector manager 252 in FIG. 2) determines a first real-world pose of the electronic device 120 relative to a first coordinate space associated with a physical environment 105 based on the eye tracking information, head pose information, body pose tracking information, camera pose tracking information, and/or the like associated with the user 150 and the electronic device 120.

In response to detecting the request to display the CGR object the first location within the CGR environment, as represented by block 6-3, the method 600 includes determining a first viewing vector corresponding to a first FOV of the CGR environment by transforming the first real-world pose from the first coordinate space to a second coordinate space associated with the CGR environment. For example, the first viewing vector characterizes an FOV of the image sensors of the electronic device (and, as a result, the FOV for the user of the electronic device) from a second set of translational coordinates (relative to the second coordinate space for the CGR environment), wherein the first viewing vector includes a camera/head pose (e.g., rotational coordinates), gaze direction, focal length, zoom, device orientation (landscape or portrait), etc. As one example, the viewing vector 520 in FIG. 5 illustrates an example data structure therefor.

In some embodiments, a transformation is performed between the first and second coordinates spaces. For example, the coordinate spaces may be identical for a simple AR scenario. In another example, the first coordinate space may be right-side up, but the second coordinate space may be upside-down or otherwise skewed for a more complex AR scenario where the user's physical environment is skinned. In yet another example, the coordinate spaces may be divergent for a VR scenario.

In some implementations, the controller 110 or a component thereof (e.g., the viewing vector manager 252 in FIG. 2) determines a first viewing vector corresponding to a first FOV of the CGR environment 425 by transforming the first real-world pose from the first coordinate space to a second coordinate space associated with the CGR environment 425. In some implementations, the first viewing vector includes translational coordinates relative to the second coordinate space associated with the CGR environment and rotational parameters associated with the electronic device. For example, the first viewing vector may also include a gaze direction, focal length, zoom, device orientation (e.g., landscape or portrait), etc.

In accordance with a determination that the first viewing vector satisfies first viewing criteria associated with the CGR environment, as represented by block 6-4, the method 600 includes displaying the CGR object at the first location within the CGR environment according to a first view mode. In some implementations, the first viewing criteria is satisfied when the first viewing vector is substantially parallel to a ground plane within the CGR environment or a plane associated with the first location, and the first location is within the FOV associated with the first viewing vector. For example, the first view mode corresponds to a first-person view, perspective view, 3D view, etc. of the CGR object. As one example, in FIG. 4A, the viewing vector satisfies the first viewing criteria, whereby the viewing vector associated with the exterior-facing image sensor of the electronic device 120 is substantially parallel to a reference plane associated with the table 107 in the physical environment 105. As such, continuing with this example, in FIG. 4A, the electronic device 120 displays the CGR content 405 according to the first view mode (e.g., a perspective view) within the CGR environment 425.

For example, the controller 110 or a component thereof (e.g., the view mode handler 254 in FIG. 2) determines whether the first viewing vector satisfies first, second, or third viewing criteria and renders the CGR environment 425 that includes the CGR object with an associated view mode. Continuing with this example, the controller 110 or a component thereof (e.g., the data transmitter 262 in FIG. 2) sends the rendered CGR environment 425 to the electronic device 120, and the electronic device 120 or a component thereof (e.g., the CGR presenter 344 in FIG. 3) presents the rendered CGR environment 425 on the display 122. In some implementations, the controller 110 or a component thereof (e.g., the view mode handler 254 in FIG. 2) also updates the CGR environment 425 to include different view modes for the CGR object when the first viewing vector changes to no longer satisfy respective viewing criteria and instead satisfy different viewing criteria.

In some implementations, the method 600 includes: displaying the CGR object at the first location within the CGR environment according to the first view mode, and detecting a change from the first real-world pose to a second real-world pose; in response to detecting the change from the first real-world pose to the second real-world pose, determining a second viewing vector corresponding to a second FOV from the second real-world pose relative to the first location according to the second coordinate space associated with the CGR environment;

and, in accordance with a determination that the second viewing vector satisfies the second viewing criteria, displaying the CGR object at the first location within the CGR environment according to the second view mode. As one example, in the sequence shown in FIGS. 4A and 4B, the viewing vector changes from satisfying the first viewing criteria to satisfying the second viewing criteria. As such, continuing with this example, the electronic device 120 displays the CGR content 405 according to the first view mode (e.g., a perspective view) within the CGR environment 425 in FIG. 4A, and the electronic device 120 displays the CGR content 422 according to the second view mode (e.g., a plan view) within the CGR environment 425 in FIG. 4B.

In accordance with a determination that the first viewing vector satisfies second viewing criteria associated with the CGR environment, as represented by block 6-5, the method 600 includes displaying the CGR object at the first location within the CGR environment according to a second view mode. In some implementations, the second viewing criteria is satisfied when the first viewing vector is substantially perpendicular to the ground plane within the CGR environment or a plane associated with the first location, and the first location is within the FOV associated with the first viewing vector. For example, the second view mode corresponds to a third person view, orthographic view, 2D view, etc. of the CGR object. As one example, in FIG. 4B, the viewing vector satisfies the second viewing criteria, whereby the viewing vector associated with the exterior-facing image sensor of the electronic device 120 is perpendicular to a reference plane associated with the table 107 in the physical environment 105). As such, continuing with this example, in FIG. 4B, the electronic device 120 displays the CGR content 422 according to the second view mode (e.g., a plan view) within the CGR environment 425.

In some implementations, the first view mode corresponds to a perspective projection of the CGR object, and the second view mode corresponds to an orthographic projection of the CGR object. In some implementations, the first view mode corresponds to a 3D view of the CGR object, and the second view mode corresponds to a 2D view of the CGR object. For example, the 2D view corresponds to a top-down or plan view. In some implementations, the first view mode corresponds to a first-person view of the CGR object, and the second view mode corresponds to a third person view of the CGR object. In some implementations, the first view mode corresponds to an exterior view of the CGR object, and the second view mode corresponds to an interior view of the CGR object.

In some implementations, the method 600 includes: enabling a first set of controls for modifying the CGR object while displaying the CGR object according to the first view mode; and enabling a second set of controls for modifying the CGR object while displaying the CGR object according to the second view mode. For example, the first and second sets of controls include overlapping controls. For example, the first and second sets of controls include at least one distinct control. For example, the first and second sets of controls include mutually exclusive controls. For example, the first and second sets of controls include controls for performing at least one of the following actions to the CGR object: for texturizing, coloring, scaling, translating, rotating, disassembling, modifying, and/or the like. For example, the first and second sets of controls include controls for adding and/or removing CGR objects to/from the CGR environment. For example, the first and second sets of controls are overlaid on the CGR environment. For example, the first and second sets of controls are presented in a toolbar that does not overlap the CGR environment.

In some implementations, as represented by block 6-5a, displaying the CGR object at the first location within the CGR environment according to the second view mode includes displaying a horizontal cross-section of the CGR object based on a distance between the first location and the electronic device. In some embodiments, while in the second view mode, descend/ascend horizontal cross-sections of the CGR object based on the distance/height of the electronic device relative to the first location. For example, the first location corresponds to a center of the CGR object. For example, as shown by the sequence in FIGS. 4B and 4C, the electronic device 120 changes from presenting the CGR content 422 associated with floor 407A in FIG. 4B to presenting the CGR content 432 associated with floor 407B in FIG. 4C in response to the distance between the electronic device 120 and the reference plane associated with the table 107 decreasing from the distance 424 in FIG. 4B to the distance 434 in FIG. 4C. In this example, the CGR content descends cross-sections of the CGR content 405 by floor.

In some implementations, the method 600 includes: while displaying the CGR object at the first location within the CGR environment according to the second view mode, detecting a change from the first real-world pose to a second real-world pose; in response to detecting the change from the first real-world pose to the second real-world pose, determining a second viewing vector corresponding to a second FOV from the second real-world pose relative to the first location according to the second coordinate space associated with the CGR environment; and, in accordance with a determination that the second viewing vector satisfies the first viewing criteria, displaying the CGR object at the first location within the CGR environment according to the first view mode.

In some implementations, the method 600 includes: while displaying the CGR object at the first location within the CGR environment according to the first or second view modes, detecting a change from the first real-world pose to a second real-world pose; in response to detecting the change from the first real-world pose to the second real-world pose, determining a second viewing vector corresponding to a second FOV from the second real-world pose relative to the first location in accordance with the second coordinate space associated with the CGR environment; and, in accordance with a determination that the second viewing vector satisfies third viewing criteria, displaying the CGR object within the CGR environment according to the second view mode. In some implementations, the third viewing criteria is satisfied when the second viewing vector is substantially perpendicular to the ground plane and the first location is not within the FOV of the electronic device associated with the second viewing vector. For example, the user sets the electronic device down on a planar surface, such as a tabletop, and wishes to continue modifying the CGR object from the second view mode such as 2D or orthographic. For example, as shown by the sequence in FIGS. 4C and 4D, the electronic device 120 maintains presentation of the CGR content 432 in the CGR environment 425 according to the second view mode in response to the electronic device 120 being placed down on the table 107 whereby the first location is no longer in the FOV but the electronic device 120 is substantially perpendicular to the reference plane associated with the table 107.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms.

These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device and one or more input devices:
obtaining a request to display a virtual object at a first location associated with a physical environment; and
in response to detecting the request to display the virtual object at the first location associated with the physical environment:
determining a first real-world pose for the electronic device relative to a first coordinate space associated with the physical environment;
determining a first viewing vector relative to the first location corresponding to a first field-of-view (FOV) of the physical environment by transforming the first real-world pose from the first coordinate space to a second coordinate space associated with a computer-generated environment;

in accordance with a determination that the first viewing vector relative to the first location satisfies first viewing criteria, displaying, via the display device, the virtual object at the first location within the computer-generated environment according to a first view mode, wherein the virtual object has a first appearance while displayed according to the first view mode; and in accordance with a determination that the first viewing vector relative to the first location satisfies second viewing criteria, displaying, via the display device, the virtual object at the first location within the computer-generated environment according to a second view mode different from the first view mode, wherein the virtual object has a second appearance different from the first appearance while displayed according to the second view mode.

2. The method of claim 1, wherein the first viewing vector includes translational coordinates relative to the second coordinate space associated with the computer-generated environment and rotational parameters associated with the electronic device.

3. The method of claim 1, wherein the first viewing criteria is satisfied when the first viewing vector is substantially parallel to a ground plane and the first location is within an FOV of the electronic device associated with the first viewing vector; and wherein the second viewing criteria is satisfied when the first viewing vector is substantially perpendicular to the ground plane and the first location is within the FOV of the electronic device associated with the first viewing vector.

4. The method of claim 1, wherein the first view mode corresponds to a perspective projection of the virtual object; and wherein the second view mode corresponds to an orthographic projection of the virtual object.

5. The method of claim 1, wherein the first view mode corresponds to a three-dimensional (3D) view of the virtual object; and wherein the second view mode corresponds to a two-dimensional (2D) view of the virtual object.

6. The method of claim 1, wherein the first view mode corresponds to a first-person view of the virtual object; and wherein the second view mode corresponds to a third person view of the virtual object.

7. The method of claim 1, wherein the first view mode corresponds to an exterior view of the virtual object; and wherein the second view mode corresponds to an interior view of the virtual object.

8. The method of claim 1, further comprising:

enabling a first set of controls for modifying the virtual object while displaying the virtual object according to the first view mode; and enabling a second set of controls for modifying the virtual object while displaying the virtual object according to the second view mode.

9. The method of claim 1, further comprising:

while displaying the virtual object at the first location within the computer-generated environment according to the first view mode, detecting a change from the first real-world pose to a second real-world pose;

in response to detecting the change from the first real-world pose to the second real-world pose, determining a second viewing vector corresponding to a second FOV from the second real-world pose relative to the first location according to the second coordinate space associated with the computer-generated environment; and in accordance with a determination that the second viewing vector satisfies the second viewing criteria, displaying the virtual object at the first location within the computer-generated environment according to the second view mode.

10. The method of claim 1, further comprising:

while displaying the virtual object at the first location within the computer-generated environment according to the second view mode, detecting a change from the first real-world pose to a second real-world pose;

in response to detecting the change from the first real-world pose to the second real-world pose, determining a second viewing vector corresponding to a second FOV from the second real-world pose relative to the first location according to the second coordinate space associated with the computer-generated environment; and in accordance with a determination that the second viewing vector satisfies the first viewing criteria, displaying the virtual object at the first location within the computer-generated environment according to the first view mode.

11. The method of claim 1, further comprising:

while displaying the virtual object at the first location within the computer-generated environment according to the first or second view modes, detecting a change from the first real-world pose to a second real-world pose;

in response to detecting the change from the first real-world pose to the second real-world pose, determining a second viewing vector corresponding to a second FOV from the second real-world pose relative to the first location according to the second coordinate space associated with the computer-generated environment; and in accordance with a determination that the second viewing vector satisfies third viewing criteria, displaying the virtual object within the computer-generated environment according to the second view mode.

12. The method of claim 11, wherein the third viewing criteria is satisfied when the second viewing vector is substantially perpendicular to the ground plane and the first location is not within the FOV of the electronic device associated with the second viewing vector.

13. The method of claim 1, wherein displaying the virtual object at the first location within the computer-generated environment according to the second view mode includes displaying a horizontal cross-section of the virtual object based on a distance between the first location and the electronic device.

14. A device comprising:

one or more processors;

a non-transitory memory;

an interface for communicating with a display device and one or more input devices; and one or more programs stored in the non-transitory memory, which, when executed by the one or more processors, cause the device to:

obtain a request to display a virtual object at a first location associated with a physical environment; and in response to detecting the request to display the virtual object at the first location associated with the physical environment:
  determine a first real-world pose for the electronic device relative to a first coordinate space associated with the physical environment;
  determine a first viewing vector relative to the first location corresponding to a first field-of-view (FOV) of the physical environment by transforming the first real-world pose from the first coordinate space to a second coordinate space associated with a computer-generated environment;
  in accordance with a determination that the first viewing vector relative to the first location satisfies first viewing criteria, display, via the display device, the virtual object at the first location within the computer-generated environment according to a first view mode, wherein the virtual object has a first appearance while displayed according to the first view mode; and
  in accordance with a determination that the first viewing vector relative to the first location satisfies second viewing criteria, display, via the display device, the virtual object at the first location within the computer-generated environment according to a second view mode different from the first view mode, wherein the virtual object has a second appearance different from the first appearance while displayed according to the second view mode.

15. The device of claim 14, wherein the first viewing criteria is satisfied when the first viewing vector is substantially parallel to a ground plane and the first location is within an FOV of the electronic device associated with the first viewing vector; and
  wherein the second viewing criteria is satisfied when the first viewing vector is substantially perpendicular to the ground plane and the first location is within the FOV of the electronic device associated with the first viewing vector.

16. The device of claim 14, wherein the first view mode corresponds to a perspective projection of the virtual object; and
  wherein the second view mode corresponds to an orthographic projection of the virtual object.

17. The device of claim 14, wherein the first view mode corresponds to a three-dimensional (3D) view of the virtual object; and
  wherein the second view mode corresponds to a two-dimensional (2D) view of the virtual object.

18. The device of claim 14, wherein displaying the virtual object at the first location within the computer-generated environment according to the second view mode includes displaying a horizontal cross-section of the virtual object based on a distance between the first location and the electronic device.

19. A non-transitory memory storing one or more programs, which, when executed by one or more processors of a device with an interface for communicating with a display device and one or more input devices, cause the device to:
  obtain a request to display a computer-generated reality (CGR) object at a first location associated with a physical environment; and
  in response to detecting the request to display the virtual object at the first location associated with the physical environment:
    determine a first real-world pose for the electronic device relative to a first coordinate space associated with the physical environment;
    determine a first viewing vector relative to the first location corresponding to a first field-of-view (FOV) of the physical environment by transforming the first real-world pose from the first coordinate space to a second coordinate space associated with a computer-generated environment;
    in accordance with a determination that the first viewing vector relative to the first location satisfies first viewing criteria, display, via the display device, the virtual object at the first location within the computer-generated environment according to a first view mode, wherein the virtual object has a first appearance while displayed according to the first view mode; and
    in accordance with a determination that the first viewing vector relative to the first location satisfies second viewing criteria, display, via the display device, the virtual object at the first location within the computer-generated environment according to a second view mode different from the first view mode, wherein the virtual object has a second appearance different from the first appearance while displayed according to the second view mode.

20. The non-transitory memory of claim 19, wherein the first viewing criteria is satisfied when the first viewing vector is substantially parallel to a ground plane and the first location is within an FOV of the electronic device associated with the first viewing vector; and
  wherein the second viewing criteria is satisfied when the first viewing vector is substantially perpendicular to the ground plane and the first location is within the FOV of the electronic device associated with the first viewing vector.

21. The non-transitory memory of claim 19, wherein the first view mode corresponds to a perspective projection of the virtual object; and
  wherein the second view mode corresponds to an orthographic projection of the virtual object.

22. The non-transitory memory of claim 19, wherein the first view mode corresponds to a three-dimensional (3D) view of the virtual object; and
  wherein the second view mode corresponds to a two-dimensional (2D) view of the virtual object.

23. The non-transitory memory of claim 19, wherein displaying the virtual object at the first location within the computer-generated environment according to the second view mode includes displaying a horizontal cross-section of the virtual object based on a distance between the first location and the electronic device.

* * * * *